United States Patent
Jones

(10) Patent No.: US 8,947,387 B2
(45) Date of Patent: Feb. 3, 2015

(54) SYSTEM AND METHOD FOR IDENTIFYING USERS AND SELECTING A HAPTIC RESPONSE

(71) Applicant: Immersion Corporation, San Jose, CA (US)

(72) Inventor: Trevor Jones, Campbell, CA (US)

(73) Assignee: Immersion Corporation, San Jose, CA (US)

( * ) Notice: Subject to any disclaimer, the term of this patent is extended or adjusted under 35 U.S.C. 154(b) by 119 days.

(21) Appl. No.: 13/713,922

(22) Filed: Dec. 13, 2012

(65) Prior Publication Data

US 2014/0168091 A1    Jun. 19, 2014

(51) Int. Cl.
*G06F 3/041* (2006.01)
*G01C 21/36* (2006.01)
*G06F 3/0488* (2013.01)
*G06F 3/01* (2006.01)

(52) U.S. Cl.
CPC .......... *G01C 21/3664* (2013.01); *G06F 3/0488* (2013.01); *G06F 3/013* (2013.01); *G06F 3/016* (2013.01); *G06F 3/0416* (2013.01); *B60K 2350/90* (2013.01); *G06F 2203/014* (2013.01)

USPC .............. 345/173; 345/156; 348/51; 715/702

(58) Field of Classification Search
USPC ............ 345/156, 173, 417; 348/E13.001, 51, 348/E13.036; 340/407.2, 407.1; 359/462, 359/466; 463/37; 715/701, 702
See application file for complete search history.

(56) References Cited

U.S. PATENT DOCUMENTS

| | | | |
|---|---|---|---|
| 2007/0080951 A1* | 4/2007 | Maruyama et al. | 345/173 |
| 2009/0322498 A1* | 12/2009 | Yun et al. | 340/407.2 |
| 2010/0128112 A1* | 5/2010 | Marti et al. | 348/51 |
| 2011/0118032 A1* | 5/2011 | Zalewski | 463/39 |
| 2011/0244963 A1* | 10/2011 | Grant et al. | 463/37 |
| 2012/0262448 A1* | 10/2012 | Kim et al. | 345/419 |

* cited by examiner

*Primary Examiner* — Koosha Sharifi-Tafreshi
(74) *Attorney, Agent, or Firm* — Pillsbury Winthrop Shaw Pittman LLP

(57) ABSTRACT

A touchscreen generates two or more displays that are visible at different viewing angles, e.g., one is visible only from the driver's seat of a car and the other is visible only from the passenger seat of the car. The displays occupy overlapping areas on the display surface such that input controls for the first display may overlap with input controls for the second display. If one of the users engages the display, the user is identified, it is determined which display the user is viewing and then which input he may be supplying, and a haptic stimulus for that display may be generated.

17 Claims, 3 Drawing Sheets

US 8,947,387 B2

SYSTEM AND METHOD FOR IDENTIFYING USERS AND SELECTING A HAPTIC RESPONSE

FIELD OF THE INVENTION

The invention relates to identifying a particular user among two or more users and providing haptic stimulus to a user based on position.

BACKGROUND OF THE INVENTION

Systems that provide haptic stimulus to users in conjunction with visual and/or audio content are known. It is generally understood that haptic stimulus may enhance one or more aspects of the experience of the users associated with the content. Additionally, dual-view screens—displays that display different images to users based on the angle of view of the user—are also known. In some cases, these dual-view screens are touchscreen displays. In some of these displays, inputs for display are placed on separate portions of the screen so that a first user that is viewing the display from a first angle is not engaging (e.g., touching or activating) the inputs intended for use by the second display. Other systems use physical buttons integrated in the bezel on the side of the display to prevent the first user from activating the inputs of the second user's display.

SUMMARY

One aspect of the invention relates to a system configured to provide haptic stimulus to a user; in some cases to two or more users. The system includes a touchscreen with a display surface that has a content delivery portion. The content delivery portion may convey sensory content to the users. The display surface may be configured to generate a first display visible at a first viewing angle and a second display visible at a second angle such that the first display and the second display are presented concomitantly at the first viewing angle and the second viewing angle, respectively. In some cases, the first display is viewable by a first user and the second display is viewable by a second user. In some implementations, the first display and the second display may be displayed in an overlapping area on the display surface. And in some implementations, the touchscreen may be further configured to generate output signals indicating locations at which the display surface may be engaged by users.

In addition to the touchscreen, in some implementations there may be a haptic output device configured to generate one or more haptic stimuli. The haptic stimuli may be a first haptic stimulus that is associated with the first display or the haptic stimulus may be a second haptic stimulus that is associated with the second display.

Along with the display and the haptic output device, there may also be one or more processors configured to execute computer program modules. Some of these modules are: an identifier module, a stimulus module, and/or a haptic output device control module. The identifier module may be configured to determine whether a user that is engaging the display surface is viewing the display surface from the first viewing angle or the second viewing angle. The stimulus module may be configured to determine an output haptic stimulus to be generated for the user. The output haptic stimulus could be the first haptic stimulus or the second haptic stimulus depending on whether the user that is engaging the display surface is viewing the display surface from the first viewing angle or the second viewing angle. The haptic output device control module may be configured to cause the haptic output device to generate the output haptic stimulus in response to the user engaging the display surface. The haptic output device control module may cause the haptic output device to output the first haptic response or the second haptic depending on whether the user engaging the display surface is viewing the display surface from the first viewing angle or the second viewing angle.

In some implementations, the touchscreen may be configured such that the first display or the second display or both have a three-dimensional view. In some of these implementations, the touchscreen may be configured such that the first display and the second display are viewable at discrete, predetermined viewing angles. And in some of these implementations; the stimulus module may be configured such that the first haptic stimulus and the second haptic stimulus are different from each other. In some of these implementations, the difference between the first haptic stimulus and the second haptic stimulus reflects a directivity and orientation of a visual effect present in the three-dimensional views.

In some versions, the system may also have a sensor configured to generate output signals conveying information related to the position of a user with respect to the content delivery portion of the touchscreen. The sensor may be a proximity sensor (e.g., capacitive, resistive, ultrasound, infrared, etc.), a weight or pressure sensor, a motion sensor, or the like or a combination of these. In these versions, there may also be a position computer program module that is configured to determine information related to the position of the user with respect to the content delivery portion of the touchscreen based on the output signals generated by the sensor.

Another aspect of the invention relates to a system configured to receive input from a user, or in some cases, two or more users, e.g., a first user and a second user. The system includes a touchscreen with a display surface configured to generate a first display visible at a first viewing angle and a second display visible at a second angle. The displays may be generated such that the first display and the second display are presented concomitantly at the first viewing angle and the second viewing angle, respectively, but in an overlapping area on the display surface. The touchscreen may further be configured to generate output signals indicating locations at which the display surface may be engaged by a user. In some implementations there may be a sensor configured to generate output signals conveying information related to whether a user (such as the first user) engaging the display surface is viewing the display surface from the first viewing angle or the second viewing angle.

In addition to the touchscreen and the sensor, in some implementations there may also be one or more processors configured to execute computer program modules. Examples of the computer program modules are an identifier module and an input resolution module. The identifier module may be configured to determine, based on the output signals generated by the sensor, whether the user that is engaging the display surface is viewing the display surface from the first viewing angle or the second viewing angle. The input resolution module may be configured to determine, in response to user engaging the display surface and based on whether the first user engaging the display surface is viewing the display surface from the first viewing angle or the second viewing angle, whether a control input is a first control input that corresponds to the first display or a second control input that corresponds to the second display.

In some implementations, the sensor may be an electronic sensor configured to generate output signals conveying information related to a user engaging the display surface and establishing a grounded connection. In other implementations, the sensor may be a motion sensor configured to generate output signals conveying information related to the user shifting his position with respect to the display surface in a manner consistent with engaging, or reaching for, the display surface using an appendage. In other implementations the sensor may be a weight sensor configured to generate output signals conveying information related to the user shifting his weight in a manner consistent with engaging, or reaching for, the display surface using an appendage. Additionally or alternatively, the sensor may be a proximity sensor configured to generate output signals conveying information related to an appendage of the user approaching the display surface. In one version, the proximity sensor can detect an angle between the plane of the display surface and the appendage, where the angle falls within a predefined range of angles.

Yet another aspect of the invention relates to a method of providing haptic stimulus to a user of a touchscreen with a display surface. The method involves generating a first display that is visible at a first viewing angle and generating a second display visible at a second angle. The first display and the second display are presented concomitantly at the first viewing angle and the second viewing angle, respectively, in an overlapping area on the display surface. A user that engages the display surface may be identified as a particular user, in some cases, from among two or more users, based on whether the user engaging the display surface is viewing the display surface from the first viewing angle or the second viewing angle. A haptic stimulus to be generated may be determined for the identified user, with the haptic stimulus varying based on whether the identified user is viewing the display surface from the first viewing angle or the second viewing angle. Then the haptic stimulus may be generated.

In some implementations generating the first display and the second display may involve generating the first or second displays, or both, as a three-dimensional view. In some of these cases, the first display and the second displays may be generated such that the first display and the second display are viewable at discrete, predetermined viewing angles. Determining the haptic stimulus to be generated then, in some cases, may involve determining separate haptic stimuli for the individual discrete, predetermined viewing angles. In some implementations, the differences in the haptic stimuli reflect a directivity and orientation of a visual effect present in the three-dimensional view that is displayed concomitantly with the haptic stimulus being generated. In some implementations, information related to the position of the user is determined with respect to the display surface, and when the haptic stimulus to be generated for the identified user is determined, it may be based on the determined position. Determining information related position may involve capturing an image that includes the user, and analyzing the captured image to determine information related to the position of the user with respect to the display surface. Additionally or alternatively, determining information related to the position of the user may involve determining the viewing angle of the user with respect to the display surface, and the haptic stimulus may vary based on whether the identified user is viewing the display surface from the first viewing angle or the second viewing angle.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
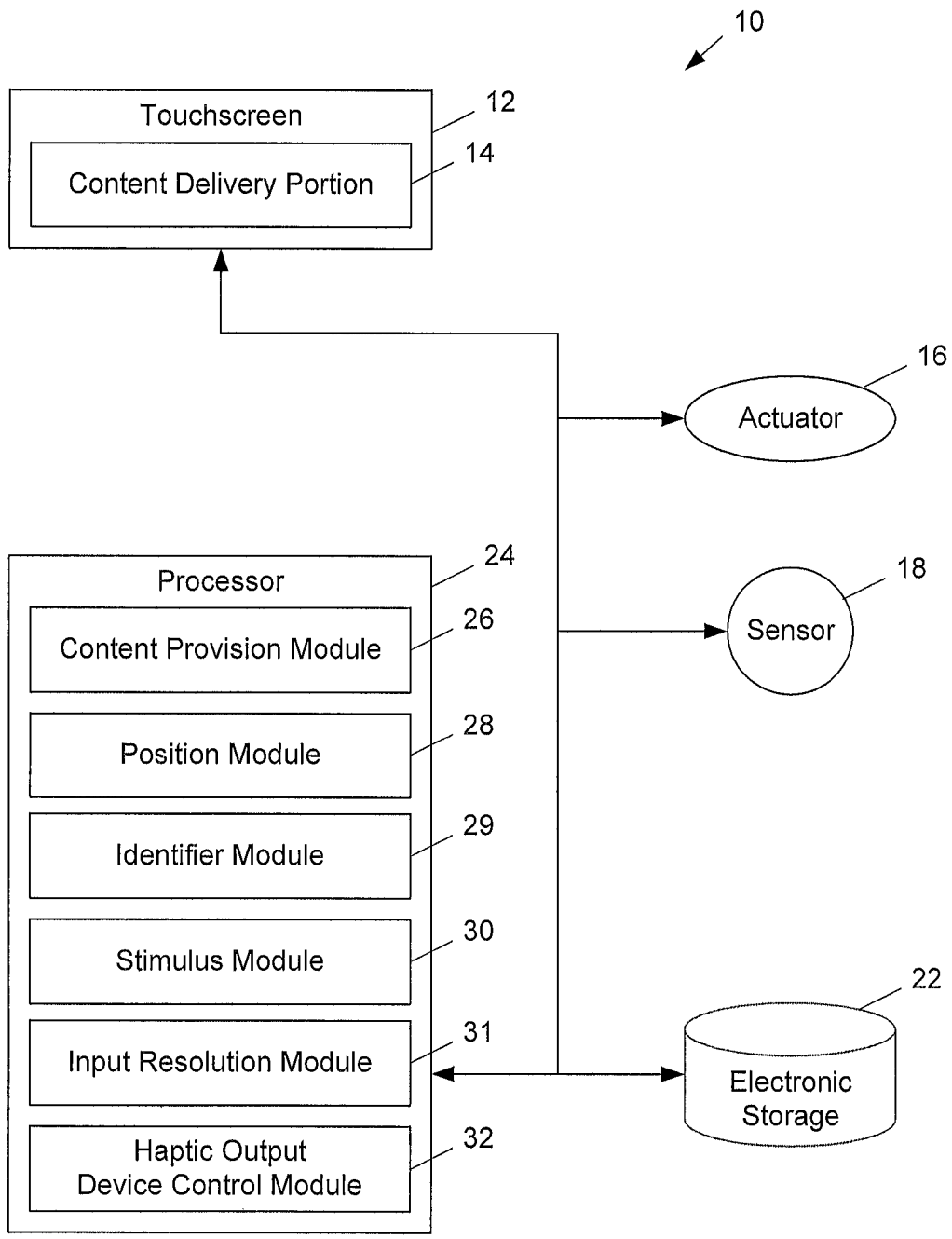
FIG. 1 illustrates a system configured to provide haptic stimulus associated with other sensory content, according to one or more embodiments of the invention.

FIG. 1 illustrates a system 10 configured to provide haptic stimulus associated with other sensory content being conveyed to one or more users. This may enhance the experience provided to the one or more users by the content. The sensory content may include video content, video game content, audio content, medical content, navigational content, menu content, three-dimensional content, and/or other content. The system 10 is configured to vary the haptic stimulus associated with the other sensory content based on position information. Such position information may include information related to the position of the one or more users, the position of a seat the user is sitting in, the position of a haptic output device delivering the haptic stimulus, and/or other position information. In one embodiment, system 10 includes one or more of a touchscreen 12 comprising a content delivery portion 14, one or more haptic output devices 16, one or more sensors 18, electronic storage 22, one or more processors 24, and/or other components.

The touchscreen 12 is configured to provide sensory content to one or more users. The sensory content is conveyed to the one or more users through content delivery portion 14 of touchscreen 12. In one embodiment, touchscreen 12 is configured to be positioned at a fixed location during the conveyance of content to the users, and not be moved and/or carried about by the users. This is not intended to be limiting, as one or more of the principles described herein could be extended to systems in which the touchscreen is movable/portable (e.g., portable gaming systems, smartphones, etc.). In one embodiment, touchscreen 12 includes an electronic display. In this embodiment, the display surface of the electronic display functions as content delivery portion 14 of touchscreen 12. In one embodiment, the housing of touchscreen 12 includes an audio speaker. In this embodiment, the area at which sound is emitted from the touchscreen 12 housing, e.g., the bezel, the perimeter of the housing, the rear of the housing, functions as content delivery portion 14. In one embodiment, touchscreen 12 includes an electronic display and an audio speaker.

The sensory content provided to users by touchscreen 12 may include video, such as movies, television, and/or other video. The sensory content provided to users by touchscreen 12 may include graphics (dynamic and/or still) associated with a videogame, a virtual world, a simulation, and/or other computer generated graphics. The sensory content provided to users by touchscreen 12 may additionally or alternatively include graphics (dynamic and/or still) associated with a medical computer program or simulation, and/or other computer generated graphics. Or, in some implementations, the sensory content provided to users by touchscreen 12 may include graphics (dynamic and/or still) associated with a navigation system, a map, and/or other computer generated graphics. In embodiments in which touchscreen 12 conveys video, computer generated graphics, and/or other visual content to users, touchscreen 12 may further provide audio content to users associated with the visual content. For example, a movie or television show, a videogame, a map with audio navigation cues, or other types of visual content, may be associated with a sound track that is conveyed to the users simultaneously with the visual content. In one embodiment, touchscreen 12 is configured to deliver audio content to the users without accompanying visual content.

In some embodiments, the display surface may be configured to generate separate displays as sensory content, where the displays are viewable only from distinct viewing angles. For example, a first display may be visible at a first viewing angle and a second display may be visible at a second viewing angle such that the first display and the second display are presented at the same time at the first viewing angle and the second viewing angle, respectively, but in overlapping areas on the display surface. In some of these implementations, the touchscreen is configured to generate output signals indicating locations at which the display surface may be engaged, (e.g., touched, activated, and/or interacted with) by users. In some instances, touchscreen 12 is configured to provide the views of the first and second displays at discrete, predetermined viewing angles with respect to the display surface functioning as content delivery portion 14.

As a non-limiting example, one implementation is a car navigation system with a single touchscreen. In this example, the sensory content delivered to the driver of the car, e.g., a map, is different than the sensory content delivered to the person sitting in the passenger seat, e.g., a movie or video game. The sensory content is delivered concomitantly to both the driver and the passenger, but the map is viewable only from the driver's seat and the movie is viewable only from the passenger's seat.

In another non-limiting example, touchscreen 12 may be used in a medical analysis scenario. In this example, touchscreen 12 may be used by two or more medical professionals positioned at different angles to touchscreen 12 and sensory content conveyed to one professional may be different that sensory content delivered to another professional. For example, if touchscreen 12 is placed in front of a standing patient's torso, a medical professional standing to the left of the touchscreen may see a left-side view of the patient's torso on the touchscreen whereas the professional standing to the right of the touchscreen may see a right-side view of the patient's torso on the touchscreen, with both views being displayed to the respective medical professionals concomitantly.

In one embodiment, touchscreen 12 is capable of conveying three-dimensional views of content to users through a display surface that functions as content delivery portion 14. The three-dimensional views may include three-dimensional views of video content, computer generated images, and/or other visual content. By way of non-limiting example, in this embodiment, touchscreen 12 may include one or more of systems employing active 3D glasses, lenticular displays, and/or other types of three-dimensional displays.

The haptic output devices 16 are configured to generate haptic stimulus for the users. As such, at least some of haptic output devices 16 are in contact with the users, or in contact with objects that contact the users, during conveyance of the sensory content to the users by touchscreen 12. By way of non-limiting example, one or more of haptic output devices 16 may be positioned in or on the touchscreen or its housing, in or on a floor surface supporting the users (e.g., installed in a seat the user is sitting in, in the floor, carried by a mat lying on the floor, etc.), one or more of haptic output devices 16 may be carried by a brace or other wearable item worn by the users, one or more of the haptic output devices 16 may be carried by objects that are carried by the users (e.g., carried by controllers or hand held devices), one or more of haptic output devices 16 may be carried by furniture on which the users are seated or lying, and/or one or more of the haptic output devices 16 may be carried by or disposed in or on other objects that contact the users.

As used herein, the term "haptic stimulus" refers to tactile feedback that is applied to the users. For example, such feedback may include one or more of vibrations, forces, and/or motions that are applied physically to the user by the haptic output devices 16 and/or the objects with which both haptic output devices 16 and the user are in contact. Non-contact tactile feedback in the form of ultrasonic energy or other forms of energy may also be implemented as haptic stimulus. The haptic output devices 16 may include any device configured to generate such feedback for application to the users. For example, haptic output devices 16 may include one or more of a piezoelectric actuator, a pneumatic actuator, an eccentric mass actuator, an electroactive polymer actuator, an electrostatic surface or a haptic output device in signal communication with an electrostatic surface, shape memory alloy, and/or other haptic output devices or haptic stimulus devices.

It will be appreciated that although haptic output devices 16 are shown in FIG. 1 as a single entity, this is for illustrative purposes only. In one embodiment, haptic output devices 16 includes a plurality of haptic output devices. The plurality of haptic output devices may be included in, carried by, and/or in contact with a single object or device. Or, the plurality of haptic output devices may include haptic output devices included in, carried by, and/or in contact with a plurality of separate objects or devices. In some embodiments where the touchscreen conveys a first display to a first user and a second display to a second user concomitantly, haptic output devices 16 may generate haptic stimuli associated with one or more of the displays. For example, haptic output devices 16 may generate a first haptic stimulus associated with a first display and additionally or alternatively generate a second haptic stimulus associated with a second display. In some embodiments the haptic stimuli for the different displays may themselves be different, e.g., the haptic stimulus associated with the first display may be different than the haptic stimulus associated with the second display. For example, in an automotive display example, one user may interact with a map and haptic output devices 16 may provide different haptic stimulus than that provided to a second user that is interacting with visual buttons on menu system of a second display. Additionally or alternatively, haptic stimulus provided to a user identified as a driver may utilize less force than a haptic stimulus provided to a passenger so as not to distract the driver.

In some instances, the differences in the first haptic stimulus and the second haptic stimulus reflect a directivity and orientation of a visual effect that is present in the three-dimensional views being conveyed to the users. In some implementations, the visual effect is present concomitantly with the haptic stimulus. For example, in a video game context with a three-dimensional view, the touchscreen may convey to two users (each viewing the touchscreen at a different angle), a ball object visually moving along a path that is between the two users. The haptic stimulus actuated for the user on the left may be less than the haptic stimulus actuated for the user on the right because the ball's path made the ball appear to come closer to the user on right than to the user on the left. In some implementations, generating the first haptic stimulus overrides the generation of the second haptic stimulus. This may be done by assigning the first user priority (e.g., where the first user is considered a "primary" user of the system) over the second user (who is considered a "secondary" user).

In a non-limiting three-dimensional automotive navigation system example, different portions of the same map content may be conveyed to the user depending on the angle from which the user is facing the display. In those cases, the users may be provided with different haptic stimulus depending on what is on the screen that each user is engaging with, e.g., haptic output devices 16 may provide different haptic stimulus if a first user is interacting with images of mountains versus the haptic output devices that may provide haptic stimulus to a second user that is interacting with a images of a lake.

In non-limiting a medical analysis example, users may be conveyed different views of different portions of the body, with the views based on the angle of view of the displays. Haptic output devices 16 may provide different stimulus to a user being conveyed one side of a patient's body with unbroken skin versus another user being conveyed a second side of the patient's body where there is an incision in the patient's skin.

The sensors 18 are configured to generate output signals that convey information related to position. In one embodiment, the output signals convey information related to the position of one or more users, haptic output devices 16 (e.g., if one or more of haptic output devices 16 are included in or carried by a movable object), a seat the user may be sitting in, the user's eye movements, and/or other objects. The positions for which information is conveyed by the output signals of sensors 18 may include one or more of positions in an absolute coordinate system, positions with respect to touchscreen 12 (e.g., positions with respect to content delivery portion 14), positions of one or both of haptic output devices 16 and/or sensors 18 with respect to a user and/or the user's body parts and/or appendages, positions of users with respect to each other, and/or positions with respect to other objects.

One or more of any of a variety of sensors that generate output signals that convey information related to position may be implemented in system 10 as sensors 18. By way of non-limiting example, sensors 18 may include one or more of an accelerometer, a gyroscope, a digital compass, a ultrasonic echo-location sensor, an optical distance or proximity sensor, a weight sensor, a movement sensor, e.g., an imaging sensor (e.g., video or still imaging), RF sensors, eye-tracking sensors, and/or other sensors. It will be appreciated that the output signals of sensors 18 may directly convey positional information, such as distances, orientations, angles, and/or other positional information. The output signals of sensors 18 may indirectly convey positional information. For example, sensors 18 may convey information related to time derivatives of position (e.g., acceleration), images from which position can be determined, and/or other types of information from which position may be determined. The output signals may be output from sensors 18 "raw," or sensors 18 may include capabilities for providing some preliminary processing.

In one embodiment, sensors 18 include one or more sensors that are carried by other components of system 10 (e.g., haptic output devices 16, sensors 18, etc.). In one embodiment, sensors 18 include one or more sensors that are not moved during use. In one embodiment, sensors 18 include one or more sensors that are provided as separate components that are wearable by users.

In one embodiment, electronic storage 22 comprises electronic storage media that electronically stores information. The electronic storage media of electronic storage 22 may include one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 22 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 22 may store software algorithms, information determined by processor 24, content to be conveyed to users through touchscreen 12, and/or other information that enables system 10 to function properly. Electronic storage 22 may be a separate component within system 10, or electronic storage 22 may be provided integrally with one or more other components of system 10 (e.g., touchscreen 12, processor 24, etc.).

Processor 24 is configured to provide information processing capabilities in system 10. As such, processor 24 may include one or more of a digital processor, an analog processor, a digital circuit designed to process information, an analog circuit designed to process information, a state machine, and/or other mechanisms for electronically processing information. Although processor 24 is shown in FIG. 1 as a single entity, this is for illustrative purposes only. In some implementations, processor 24 may include a plurality of processing units. These processing units may be physically located within the same device, or processor 24 may represent processing functionality of a plurality of devices operating in coordination. For example, in one embodiment, the functionality attributed below to processor 24 is divided between a first processor provided in a computer, a videogame console, an optical disk player, and/or other home entertainment equipment, and a second processor that communicates with the first processor to provide position information to the first processor.

As is shown in FIG. 1, processor 24 may be configured to execute one or more computer program modules. The one or more computer program modules may include one or more of a content provision module 26, a position module 28, an identifier module 29, a stimulus module 30, an input resolution module 31, a haptic output device control module 32, and/or other modules. Processor 24 may be configured to execute modules 26, 28, 29, 30, 31, and/or 32 by software; hardware; firmware; some combination of software, hardware, and/or firmware; and/or other mechanisms for configuring processing capabilities on processor 24.

It should be appreciated that although modules 26, 28, 29, 30, 31, and 32 are illustrated in FIG. 1 as being co-located within a single processing unit, in implementations in which processor 24 includes multiple processing units, one or more of modules 26, 28, 29, 30, 31, and/or 32 may be located remotely from the other modules. The description of the functionality provided by the different modules 26, 28, 29, 30, 31, and/or 32 described below is for illustrative purposes, and is not intended to be limiting, as any of modules 26, 28, 29, 30, 31, and/or 32 may provide more or less functionality than is described. For example, one or more of modules 26, 28, 29, 30, 31, and/or 32 may be eliminated, and some or all of its functionality may be provided by other ones of modules 26, 28, 29, 30, 31, and/or 32. As another example, processor 24 may be configured to execute one or more additional modules that may perform some or all of the functionality attributed below to one of modules 26, 28, 29, 30, 31, and/or 32.

The content provision module 26 is configured to control the provision of content to the users via touchscreen 12. If the content includes computer generated images (e.g., in a videogame, virtual world, simulation, medical analysis, computer-generated map, etc.), content provision module 26 is configured to generate the images and/or views for display to the users through touchscreen 12. If the content includes video and/or still images, e.g., overhead photographs for a map, content provision module 26 is configured to access the video and/or still images and to generate views of the video and/or still images for display on touchscreen 12. If the content includes audio content, content provision module 26 is configured to generate the electronic signals that will drive touchscreen 12 to output the appropriate sounds. The content, or information from which the content is derived, may be obtained by content provision module 26 from electronic storage 22.

The position module 28 is configured to determine position information from the output signals generated by sensors 18. The position information may include information related to one or more of positions of users, positions of haptic output devices 16, positions of sensors 18, positions of seats, and/or other positions. The information related to position determined by position module 28 may describe the position of one or more objects (e.g., users, haptic output devices 16, sensors 18, seats, etc.) in an absolute coordinate system, with respect to other objects, and/or in other contexts. As used herein, "position information" or "information related to position" does not refer to gestures or movements correlated with control inputs. Instead, "position information" or "information related to position" refers simply to information that describes the position of an object, either in a coordinate system or with respect to some other object. Such information may include, without limitation, coordinates, distances, rotational orientations, and/or angular relationships.

The identifier module 29 is configured to determine whether the first user engaging the display surface is viewing the display surface from the first viewing angle or the second viewing angle. As described above, touchscreen 12 may display multiple displays concomitantly in overlapping areas of the content delivery portion 14. In some implementations, as a user engages touchscreen 12, sensor 18 may generate output signals that convey information related to whether the user engaging the display surface is viewing the display surface from the first viewing angle or the second viewing angle as described above, e.g., in a dual-view system, proximity sensors in or near the touchscreen may detect that an appendage of the user is approaching from the right side or the left side of the touchscreen, the user may shift his weight in a manner consistent with engaging the touchscreen, or the user's hand or wrist may contact the side of the touchscreen on a bezel portion, thereby completing a circuit, which in turn indicates a side that the user's hand is coming from. In some implementations, sensor 18 may be an eye tracking camera and may track the movements of a user's eye to identify which viewing angle the user is viewing the screen from and/or may detect or indicate that the user is actively looking at the screen. In some implementations, sensors 18 and position module 28 can provide position information for the user such that the specific hand the user is using to engage the touchscreen can be identified. This can be accomplished via image processing for images taken of the user, weight sensors, e.g., the user would shift his weight one way to engage with his right hand versus engaging with his left hand, and other sensory input.

Figure 2:
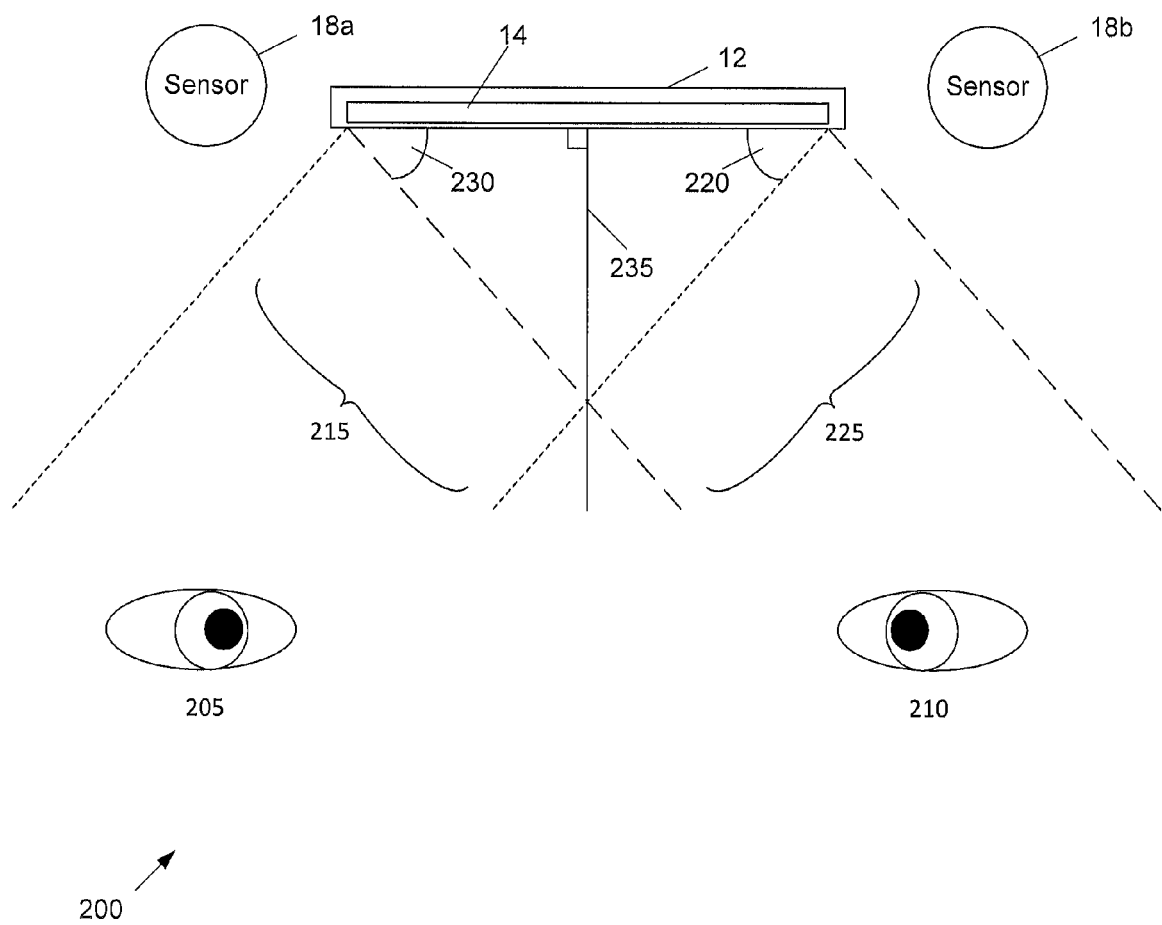
FIG. 2 depicts a top-down view of two users viewing the content delivery portion of the touchscreen, according to one or more embodiments of the invention.

As described above, in some implementations, position module 28 determines the position of sensors and users. Based on this, identifier module 29 assigns users to a particular position, i.e., identifies, whether the user is viewing the display surface from the first viewing angle or the second viewing angle. FIG. 2 depicts an illustrative example.

FIG. 2 depicts a top-down view 200 of two users 205, 210 viewing the content delivery portion 14 of touchscreen 12. User 205 is conveyed a first display 215 at angle 220 relative to the touchscreen 12 and user 210 is conveyed a second display 225 at angle 230 relative to the touchscreen. The normal 235 to touchscreen and the content delivery portion is shown for reference.

Still using FIG. 2 as an example, in some implementations, identifier module 29 receives position information from position module 28 and position module 28 receives positional information from sensors, e.g., a proximity sensor 18a on the left of the display indicating that user 205's hand is approaching touchscreen 12 from the left side (sensor 18b detects appendages that approach from the right side). Position module 28 determines that there is a user to the left of the display. Identifier module 29 designates and identifies this user, i.e., user 205, as the user engaging the touchscreen. Identifier module 29 then determines that user 205, being the user to the left of the display, is viewing display 215. This determination and identification is used by the input resolution module 31 to resolve inputs received and by the system 10 to output appropriate haptic stimuli to the appropriate user.

Referring back to FIG. 1, the input resolution module 31 is configured to determine whether an input received, e.g., via the touchscreen, is an input that corresponds to an input associated with one of the multiple displays, e.g., is an input associated with the first display or an input associated with the second display. As described above, when multiple displays are conveyed to multiple users, the displays sometimes occupy overlapping areas on the display surface. In these scenarios, a user engaging the touchscreen at a particular X, Y coordinate does not, by itself, convey to system 10 which display—and consequentially, which input—that user's engagement relates to. Based on identifier module's 29 determination which user is using touchscreen 12, input resolution module 31 determines whether a control input that is received corresponds to a control input of the first display or if it corresponds to a control input of the second display. As described above, identifier module 29 determines which user is engaging the display and which display is being conveyed to that user. In some embodiments, Input resolution module receives an input from the touchscreen, e.g., an X, Y coordinate where the user has touched the touchscreen, and then compares that X, Y coordinate to inputs on the display that is being presented to the identified user. Then, if that X, Y coordinate corresponds to an input option on that display, the input is received, and/or activated.

The stimulus module 30 is configured to determine haptic stimulus to be generated for the user. Determining the haptic stimulus includes determining which one(s) of haptic output devices 16 should apply the stimulus, and/or determining one or more parameters of the haptic stimulus. Such one or more parameters may include one or more of magnitude of force, directivity and orientation, location of the stimulus, frequency of vibration, magnitude, duration, and/or other parameters.

The haptic stimulus determined by stimulus module 30 is associated with the sensory content being conveyed by touchscreen 12. As such, the stimulus may be dictated, at least to some extent, by the information stored electronically with the content (e.g., on electronic storage 22). The haptic stimulus is determined by stimulus module 30 to enhance one or more aspects of the experience provided by the content. For example, the haptic stimulus may be determined to enhance one or more of the realism of the content, the enjoyability of content, perception of the content by the users, and/or other aspects of the experience provided by the content being conveyed to the users via touchscreen 12.

To enhance the one or more aspects of the experience provided by the content being conveyed to the users via touchscreen 12, stimulus module 30 is configured to determine the haptic stimulus based on which user to apply the haptic stimulus, which may include information related to position. This includes varying the haptic stimulus based on user position with respect to touchscreen 12, position of one body part of a user with respect to another body part of the user, position of one user with respect to one or more other users, and/or position information. In varying the haptic stimulus based on position, stimulus module 30 may change the stimulus in distinct steps, or smoothly. For example, if touchscreen 12 is configured to provide three-dimensional views at discrete, predetermined viewing angles with respect to the display surface functioning as content delivery portion 14, then stimulus module 30 may vary the haptic stimulus such that each of the predetermined viewing angles receives haptic stimulus corresponding to its three-dimensional view. As another example, if one user is standing behind another user with respect to touchscreen 12, the haptic stimulus provided to the user that is further away may reflect "shielding" by the user standing in the middle.

The determination of the haptic stimulus to account for position information may be based on determinations of position information by position module 28, determination of a particular user by identifier module 29, and/or position information related to the positions of haptic output devices 16 that is prestored or configured. It will be appreciated that the discussion of varying haptic stimulus based on position information described herein is distinct from varying haptic stimulus based on input or control gestures. The determination of haptic stimulus based on position by stimulus module 30 is not dependent on a gesture or physical maneuver being performed by a user. Instead, haptic stimulus determined by stimulus module 30 that corresponds to a given control or input gesture would vary based on the position of the user (or relative positions of the users body parts) during performance of the control or input gesture). Similarly, haptic stimulus that does not correspond to a control or input gesture (e.g., associated with an effect or component of the content being conveyed to the user) may be determined by stimulus module 30 to vary based on similar position information.

In one embodiment, stimulus module 30 determines haptic stimulus to be generated for a user to coincide with the directivity and orientation of an effect in the content being conveyed to the user. For example, if touchscreen 12 is configured to generate three-dimensional images through a display surface functioning as content delivery portion 14, the haptic stimulus is varied as a function of viewing angle, distance from content delivery portion 14, and/or both viewing angle and distance to convey the directivity and orientation of a visual entity in a three-dimensional view being conveyed by touchscreen 12. Other position-related parameters may be used instead, or in conjunction with, viewing angle and/or distance to vary the haptic stimulus.

As a specific instance of this example, if a ball in the three-dimensional view is projected outward away from content delivery portion 14 along a path, the haptic stimulus is determined by stimulus module 30 to mimic being hit by the ball for users positioned on or near the path. Users positioned off of the path, on the other hand, would not receive such stimulus. It will be appreciated that some other projectile may be substituted for the ball. As another specific instance of this example, if an explosion is shown in the three-dimensional view, the haptic stimulus can be used to enhance the realism of the explosion. This would include determining the magnitude, amount, and/or type of haptic stimulus to coincide with the directivity and orientation of the explosion.

These instances of generating haptic stimulus to coincide with the directivity and/or orientation of an effect in a three-dimensional view being conveyed by touchscreen 12 are not intended to be limiting. Other instances of this exemplary use of position information to determine haptic stimulus may be implemented without departing from the scope of this disclosure. It will be appreciated that the description of varying haptic stimulus to reflect the directivity and/or orientation of events in the content being conveyed by touchscreen 12 are not limited to three-dimensional views, or even to visual effects. The same principles may be applied to effects in two-dimensional views, and/or to audio effects.

In one embodiment, haptic output devices 16 include one or more haptic output devices that are fixed positionally with respect to touchscreen 12 during conveyance of the content. For example, haptic output devices 16 may include haptic output devices carried by or included in furniture, a floor, a mat, and/or other objects that are fixed during conveyance of the content. In this embodiment, stimulus module 30 may determine haptic stimulus for the fixed positions of haptic output devices 16. Position information related to these fixed positions may include one or more of position information that is preconfigured and/or prestored for use by stimulus module 30.

In one embodiment, haptic output devices 16 include one or more haptic output devices that are included in or carried by objects that are worn, carried, or otherwise moved by the user. In this embodiment, the haptic stimulus to be generated by the portable haptic output devices is determined by stimulus module 30 based on position information received by stimulus module 30 from position module 28 that is related to the position of the users and/or the movable haptic output devices with respect to touchscreen 12. For example, the movable haptic output devices may be included in game controllers, wearable braces, a pillow, a stuffed animal, a toy, and/or other objects.

The haptic output device control module 32 is configured to control haptic output devices 16 to generate the haptic stimulus determined by stimulus module 30. This includes communicating the haptic stimulus to be generated from processor 24 to haptic output devices 16. The haptic stimulus to be generated may be communicated over wired communication links, wireless communication links, and/or other communication links between processor 24 and haptic output devices 16. In one embodiment, at least a portion of the functionality attributed to the haptic output device control module 32 is disposed in a processor carried in a seat the user is sitting in, and/or some other object that carries one or more of haptic output devices 16.

Figure 3:
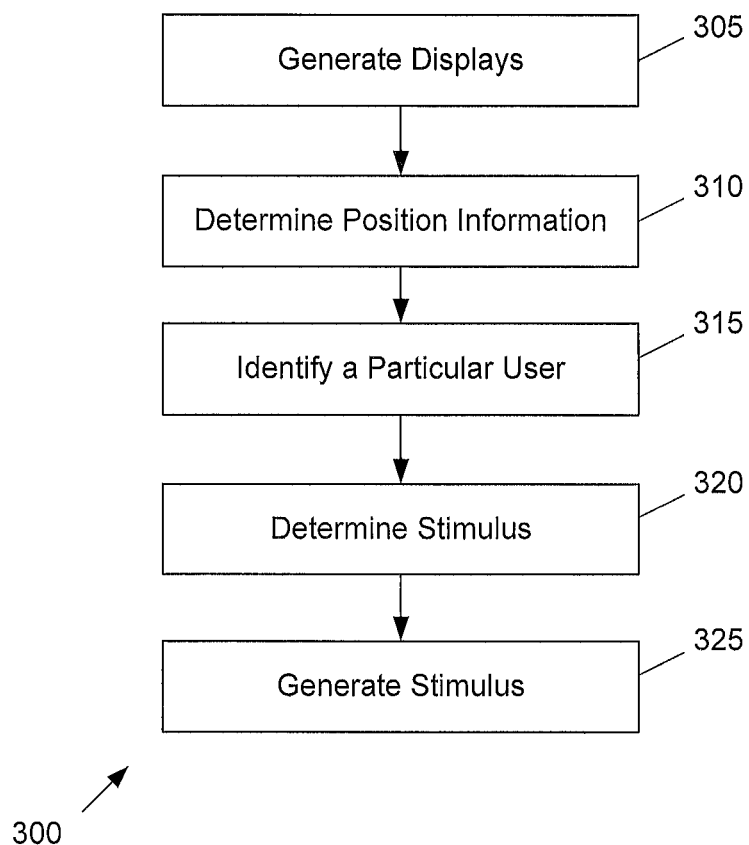
FIG. 3 illustrates a method of providing haptic stimulus associated with other sensory content, in accordance with one or more embodiments of the invention.

FIG. 3 illustrates a method 300 of providing haptic stimulus associated with other sensory content being conveyed to one or more users. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 305, a first and second display for conveying content to users are generated, with the first display visible at a first viewing angle and the second display viewable at a second viewing angle. The sensory content may include visual content, audio content, and/or other sensory content. The sensory content is conveyed to the one or more users by a touchscreen similar to or the same as touchscreen 12, having a content delivery portion similar to or the same as content delivery portion 14 (shown in FIG. 1 and described above). The displays are then presented, e.g., via a touchscreen, concomitantly to the users at the respective viewing angles. In some embodiments the first display and the second displays are presented in an overlapping area on the touchscreen's display surface.

At an operation 310 position information may be determined. The position information may be related to the position(s) of one or more of a user, one or more body parts of a user, a seat the user is sitting in, a haptic output device, and/or other objects. The position information may indicate position in an absolute coordinate system, relative to the touchscreen, the content delivery portion, a user, and/or other objects. In one embodiment, operation 310 is performed by a position module similar to or the same as position module 28 (shown in FIG. 1 and described above).

At operation 315, the user may be identified based on the position information and it determined if the user is viewing the display surface from the first viewing angle or the second viewing angle and consequentially which display the user is viewing. In one embodiment, operation 315 is performed by an identifier module similar to or the same as identifier module 29 (shown in FIG. 1 and described above).

In some embodiments, the method may additionally include an operation (not shown) to resolve input being provided by the user. In those embodiments, input is received from the user and the input is compared against possible inputs that are displayed on the display that is being shown to that user. In these implementations, resolving the input is performed by an input resolution module similar to or the same as input resolution module 31 (shown in FIG. 1 and described above).

At an operation 320, haptic stimulus to be generated for the one or more users is determined. The haptic stimulus is associated with the content conveyed to the user. The haptic stimulus is determined such that it based on the identified user and the position information. The position information may describe the position of one or more of a user, one or more body parts of a user, a seat the user is sitting in, a haptic output device, and/or other objects. The position information may indicate position in an absolute coordinate system, relative to the touchscreen, the content delivery portion, a user, and/or other objects. The position information may include the position information determined at operations 310, 315, position information that is preconfigured and/or prestored, and/or other position information. In one embodiment, operation 320 is performed by a stimulus module similar to or the same as stimulus module 30 (shown in FIG. 1 and described above).

At an operation 325, the haptic stimulus is generated for the identified user. In one embodiment, operation 325 is performed by one or more haptic output devices similar to or the same as haptic output devices 16 (shown in FIG. 1 and described above).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system configured to provide haptic stimulus, the system comprising:

a touchscreen with a display surface having a content delivery portion from which sensory content is conveyed to a user, the display surface configured to generate a first display visible at a first viewing angle and a second display visible at a second angle such that the first display and the second display are presented concomitantly at the first viewing angle and the second viewing angle, respectively, in an overlapping area on the display surface, wherein the touchscreen is further configured to generate output signals indicating locations at which the display surface may be engaged by the user;

a haptic output device configured to generate a first haptic stimulus associated with the first display and to generate a second haptic stimulus associated with the second display; and one or more processors configured to execute computer program modules, the computer program modules comprising:

an identifier module configured to determine whether the user engaging the display surface is viewing the display surface from the first viewing angle or the second viewing angle;

a stimulus module configured to determine an output haptic stimulus to be generated for the user, wherein the output haptic stimulus is the first haptic stimulus or the second haptic stimulus based on whether the user engaging the display surface is viewing the display surface from the first viewing angle or the second viewing angle; and a haptic output device control module configured to cause the haptic output device to generate the output haptic stimulus responsive to the user engaging the display surface, wherein the haptic output device control module causes the haptic output device to output the first haptic stimulus or the second haptic stimulus based on whether the user engaging the display surface is viewing the display surface from the first viewing angle or the second viewing angle.

2. The system of claim 1, wherein the touchscreen is configured such that one or more of the first and second displays comprise a three-dimensional view.

3. The system of claim 2, wherein the touchscreen is configured such that the first display and the second display are viewable at discrete, predetermined viewing angles, and wherein the stimulus module is configured such that the first haptic stimulus and the second haptic stimulus are different from each other.

4. The system of claim 3, wherein the differences in the first haptic stimulus and the second haptic stimulus reflect a directivity and orientation of a visual effect present in the three-dimensional views being conveyed at the discrete, predetermined viewing angles concomitantly with the haptic stimulus.

5. The system of claim 1, further comprising:
a sensor configured to generate output signals conveying information related to the position of the user with respect to the content delivery portion of the touchscreen; and
wherein the computer program modules further comprise:
a position module configured to determine the information related to the position of the user with respect to the content delivery portion of the touchscreen based on the output signals generated by the sensor.

6. A system configured to receive input from a user, the system comprising:
a touchscreen with a display surface configured to generate a first display visible at a first viewing angle and a second display visible at a second angle such that the first display and the second display are presented concomitantly at the first viewing angle and the second viewing angle, respectively, in an overlapping area on the display surface, wherein the touchscreen is further configured to generate output signals indicating locations at which the display surface may be engaged by the user;
a sensor configured to generate output signals conveying information related to whether the user engaging the display surface is viewing the display surface from the first viewing angle or the second viewing angle;
a haptic output device configured to generate a first haptic stimulus associated with the first display and to generate a second haptic stimulus associated with the second display; and
one or more processors configured to execute computer program modules, the computer program modules comprising:
an identifier module configured to determine, based on the output signals generated by the sensor, whether the user engaging the display surface is viewing the display surface from the first viewing angle or the second viewing angle;
an input resolution module configured to determine whether a control input responsive to the user engaging the display surface is a first control input that corresponds to the first display or a second control input that corresponds to the second display, wherein the input resolution module is configured to make the determination based on whether the user engaging the display surface is viewing the display surface from the first viewing angle or the second viewing angle; and
a haptic output device control module configured to cause the haptic output device to generate the output haptic stimulus responsive to the user engaging the display surface, wherein the haptic output device control module causes the haptic output device to output the first haptic stimulus or the second haptic stimulus based on whether the user engaging the display surface is viewing the display surface from the first viewing angle or the second viewing angle.

7. The system of claim 6 wherein the sensor comprises an electronic sensor configured to generate output signals conveying information related to the user engaging the display surface.

8. The system of claim 6 wherein the sensor comprises a motion sensor configured to generate output signals conveying information related to the user shifting his position with respect to the display surface in a manner consistent with the user engaging the display surface using an appendage.

9. The system of claim 6 wherein the sensor comprises a weight sensor configured to generate output signals conveying information related to the user shifting his weight in a manner consistent with the user engaging the display surface using an appendage.

10. The system of claim 6 wherein the sensor comprises a proximity sensor configured to generate output signals conveying information related to an appendage of the user approaching the display surface at an angle between a plane of the display surface and the appendage, wherein the angle is within a predefined range of angles.

11. A method of providing haptic stimulus to a user of a touchscreen with a display surface, the method comprising:
generating a first display visible at a first viewing angle and a second display visible at a second viewing angle wherein the displays are presented concomitantly at the first viewing angle and the second viewing angle, respectively, in an overlapping area on the display surface;
identifying a particular user engaging the display surface based on whether the user engaging the display surface is viewing the display surface from the first viewing angle or the second viewing angle;
determining haptic stimulus to be generated for the identified user, wherein the haptic stimulus varies based on whether the identified user is viewing the display surface from the first viewing angle or the second viewing angle; and
generating the haptic stimulus.

12. The method of claim 11, wherein generating the first display and the second display comprises generating the first or second displays as a three-dimensional view.

13. The method of claim 12, wherein the first display and the second displays are generated such that the first display and the second display are viewable at discrete, predetermined viewing angles, and wherein determining haptic stimulus to be generated for the identified user comprises determining separate haptic stimulus for the individual discrete, predetermined viewing angles.

14. The method of claim 13, wherein the differences in haptic stimulus determined for the individual discrete, predetermined viewing angles reflect a directivity and orientation of a visual effect present in the three-dimensional view displayed concomitantly with generation of the haptic stimulus.

15. The method of claim 11, further comprising:
determining information related to the position of the user with respect to the display surface, and
wherein determining haptic stimulus to be generated for the identified user comprises determining the haptic stimulus based on the determination of position.

16. The method of claim 15, wherein determining information related to the position of the identified user comprises capturing an image that includes the user, and analyzing the captured image to determine information related to the position of the user with respect to the display surface.

17. The method of claim 15, wherein determining information related to the position of the user comprises determining the viewing angle of the user with respect to the display surface, and wherein the determined haptic stimulus varies based on whether the identified user is viewing the display surface from the first viewing angle or the second viewing angle.

* * * * *